United States Patent [19]
Cioffi

[11] Patent Number: 5,519,731
[45] Date of Patent: May 21, 1996

[54] ADSL COMPATIBLE DISCRETE MULTI-TONE APPARATUS FOR MITIGATION OF T1 NOISE

[75] Inventor: John M. Cioffi, Cupertino, Calif.

[73] Assignee: Amati Communications Corporation, Mountain View, Calif.

[21] Appl. No.: 227,778

[22] Filed: Apr. 14, 1994

[51] Int. Cl.$^6$ ........................................ H04K 1/10
[52] U.S. Cl. .................... 375/260; 375/240; 375/285; 375/296; 375/340; 375/346; 370/6; 370/70; 348/388; 348/436; 379/93
[58] Field of Search ................................ 375/240, 259, 375/260, 285, 295, 296, 316, 340, 348, 349; 370/6, 70, 71, 44.1, 118; 455/266; 379/93, 97; 348/388, 398, 436

[56] References Cited

U.S. PATENT DOCUMENTS

| | | | |
|---|---|---|---|
| 4,438,511 | 3/1984 | Baran | 370/19 |
| 4,731,816 | 3/1988 | Hughes-Hartogs | 379/98 |
| 4,757,495 | 7/1988 | Decker et al. | 370/76 |
| 4,980,897 | 12/1990 | Decker et al. | 375/260 |
| 5,285,474 | 2/1994 | Chow et al. | 375/13 |
| 5,313,467 | 5/1994 | Varghese et al. | 370/94.1 |

*Primary Examiner*—Stephen Chin
*Assistant Examiner*—Amanda T. Le
*Attorney, Agent, or Firm*—Hickman Beyer & Weaver

[57] ABSTRACT

An improved discrete multi-tone transmission scheme is describe that contemplates encoding digital data and modulating the encoded data onto a discrete multi-tone signal having a total bandwidth of at least 1.6 MHz. The modulation system is capable of dynamically updating the subcarriers used and the amount of data transmitted on each subcarrier during transmission in order to accommodate real time changes in the line quality over particular subcarriers. In one preferred embodiment of the invention the multi-tone encoding and modulation is done in substantial compliance with the ATIS North American Asymmetric Digital Subscriber Lines standard although a total of 512 subchannels each having a bandwidth of approximately 4.3125 kHz are used. In this system, the subchannels that occur at frequencies above those set forth in the standard are treated similarly to those within the standard range in terms of subcarrier selection criteria. This embodiment contemplates the use of a discrete multi-tone signal having an available bandwidth of 2.208 MHz. The described system permits transmission of digital data at transmission rates of 6 Mbps over telephone lines at distances of two miles even on lines that experience significant T1 crosstalk noise. In one application of the invention, it may be used with ordinary telephone lines such as twisted pair lines to transmit data to remote receivers located up to six thousand feet from the transmitter at digital data transmission rates of at least ten million bits per second (10 Mbps). With more subchannels provided, the number of subchannels available for upstream communications may also be increased.

20 Claims, 5 Drawing Sheets

ADSL COMPATIBLE DISCRETE MULTI-TONE APPARATUS FOR MITIGATION OF T1 NOISE

BACKGROUND OF THE INVENTION

The present invention relates generally to systems for the transmission and reception of multi-carrier, high speed data signals. More particularly, a discrete multi-tone (DMT) system having a widened bandwidth is described.

At the time of this writing, the Alliance For Telecommunications Information Solutions (ATIS), which is group accredited by the ANSI (American National Standard Institute) Standard Group, is nearing finalization of a standard for the transmission of digital data over Asymmetric Digital Subscriber Lines (ADSL). The standard is intended primarily for transmitting video data over ordinary telephone lines, although it may be used in a variety of other applications as well. The standard is based on a discrete multi-tone transmission system. The pending North American Standard is referred to as the T1E1.4 ATIS Standard, and is presently set forth in Standard Contribution No. 94-007, rev. 1, dated January of 1994, which is incorporated herein in its entirety. Transmission rates are intended to facilitate the transmission of information at rates of at least 6 million bits per second (i.e., 6+Mbps) over ordinary phones lines, including twisted-pair phone lines. The standardized discrete multi-tone (DMT) system uses 256 "tones" that are each 4.3125 kHz wide in the forward (downstream) direction. That is, in the context of a phone system, from the central office (typically owned by the telephone company) to a remote location that may be an end-user (i.e., a residence or business user).

The Asymmetric Digital Subscriber Lines standard also contemplates the use of a duplexed reverse signal at a data rate of at least 608 Kbps. That is, transmission in an upstream direction, as for example, from the remote location to the central office. Thus, the term Asymmetric Digital Subscriber Line comes from the fact that the data transmission rate is substantially higher in the forward direction than in the reverse direction. This is particularly useful in systems that are intended to transmit video programming or video conferencing information to a remote location over the telephone lines. By way of example, one potential use for the systems allows residential customers to obtain videos information such as movies over the telephone lines rather than having to rent video cassettes. Another potential use is in video conferencing.

As is well known to those familiar with the Asymmetric Digital Subscriber Lines standardization process, as well as telephone systems generally, most telephone systems are divided into a multiplicity of carrier service areas that have a desired maximum carrier service area (CSA) range of 2 miles from a "central office" when 24-gauge twisted pair wiring is used and 9000 feet when 26-gauge wiring is used. Thus, one of the important features in the standardization process was that the selected system be capable of being transmitted throughout a CSA range from a central office over ordinary 24 gauge twisted-pair phone lines. This requires both that the signal does not attenuate an unreasonably high amount and that it be relatively tolerant of crosstalk noise.

One acknowledged drawback of the discrete multi-tone solution for the Asymmetric Digital Subscriber Line standard is that when T1 crosstalk noise is present in the same binder or an adjacent binder, the transmission scheme has difficulty reaching the outer limits of the prescribed range with reliable signals. T1 circuits generally carry 24 voice channels at a data rate of approximately 1.544 million bits per second and are generally known to create a significant amount of crosstalk noise. In fact, the presence of T1 noise will generally cut the range of a digital multi-tone signal to less than the CSA range given the desired power limitations and permissible bit error rates. Accordingly, it appears that special provisioning may be required to ensure complete carrier servicing area coverage in all cases. Although the types of telephone systems that experience T1 noise are quite low on a percentage basis, it is widely perceived as being important to have 100 percent compatibility in any standardized service. It would, of course, have been desirable to guarantee complete carrier service area coverage with a standardized technology. However, it was widely believed that such a range was impossible given the nature of the discrete multi-tone technology. The present invention is believed to be one solution to the T1 crosstalk noise problem. The present invention also provides a solution that has numerous advantages well beyond the mitigation of T1 noise problems. Specifically, it is equally applicable to phone systems that experience E1 noise (which are primarily located outside of North America), although the problem is more pronounced in areas that experience T1 crosstalk noise. Further, in areas which are not susceptible to T1 or E1 crosstalk noise (which is the vast majority of the installed telephone system base), the described invention permits reliable transmission of digital information at the rate of 15 Mbps per second at distances of at least a mile. The system also permits a provision for higher speed transmissions in the upstream direction.

SUMMARY OF THE INVENTION

In view of the foregoing, it is an object of the present invention to provide a method of transmitting digital information from a source over a potentially noisy subscriber communication line using a discrete multi-tone transmission scheme. The system contemplates encoding digital data and modulating the encoded data onto a discrete multi-tone signal having a total bandwidth of at least 1.6 MHz. The communication line is monitored to determine at least one line quality parameter including noise levels at each of a multiplicity of subchannels that each correspond to an associated subcarrier tone. The modulation scheme is arranged to take into consideration various factors including the detected line quality parameters, subchannel gain parameters, and a permissible power mask parameter when modulating the discrete multi-tone signal. The modulation system is also capable of dynamically updating the subcarriers used and the amount of data transmitted on each subcarrier during transmission in order to dynamically vary the subchannels used to transmit data and/or the amount of information transmitted on each subchannel to accommodate real time changes in the line quality over particular subcarriers. A receiver located at a remote location relative to the transmitter is arranged to receive, demodulate and decode the discrete multi-tone signal.

In one preferred embodiment of the invention the multi-tone encoding is done in substantial compliance with the ATIS Asymmetric Digital Subscriber Lines standard although a total of 512 subchannels each having a bandwidth of approximately 4.3125 kHz are used. In this system, the subchannels that occur at frequencies above those set forth in the standard are treated similarly to those within the standard range in terms of subcarrier selection criteria. This embodiment contemplates the use of a discrete multi-tone signal having an available bandwidth of 2.208 MHz.

In one application of the invention, it may be used in systems that use T1 telephone lines as the communication lines. When significant T1 crosstalk noise is present, the signals are transmitted over subcarriers having frequencies above and below the most significant T1 crosstalk noise to facilitate transmission of the encoded digital data throughout a two mile carrier service area at a data transmission rate of at least six million bits per second (6 Mbps).

In another application of the invention, it may be used with ordinary telephone lines such as twisted pair lines to transmit data to remote receivers located up to six thousand feet from the transmitter at digital data transmission rates of at least ten million bits per second (10 Mbps).

In another application of the invention, additional subchannels may be made available for upstream communications to permit upstream communication at data rates of up to at least 1.544 million bits per second (i.e., the T1 data transmission rate).

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

Figure 1:
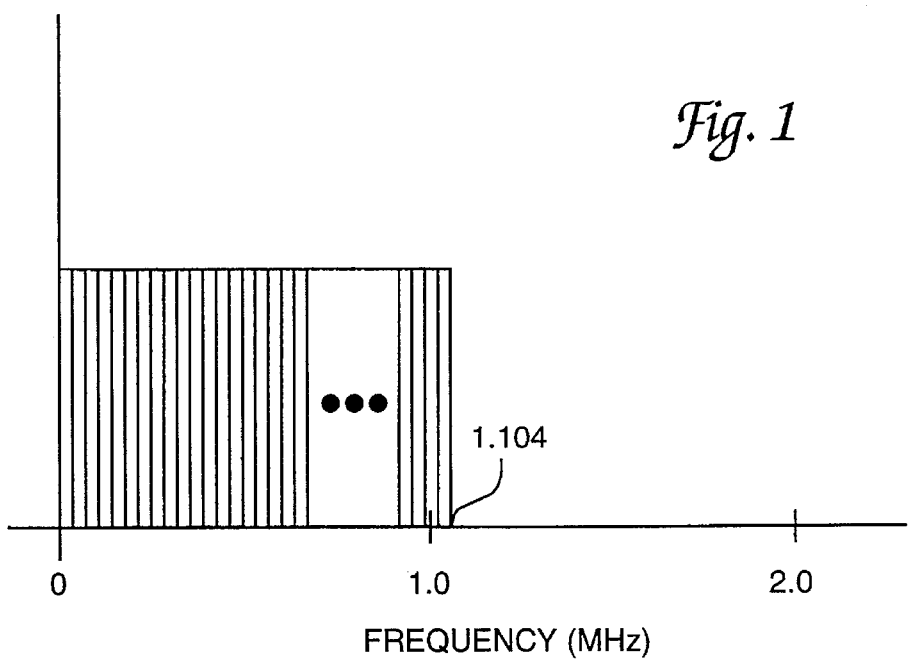
FIG. 1 is a graph illustrating a discrete multi-tone transmission band in accordance with the ATIS North American Standard.

The presently proposed ATIS Asymmetric Digital Subscriber Line North American standard contemplates use of a Discrete Multi-Tone (DMT) data transmission scheme. A detailed description of the protocols for the Discrete Multi-Tone transmission scheme is described in detail in the above referenced ATIS contribution, which is incorporated herein by reference in its entirety. As illustrated in FIG. 1, the standardized discrete multi-tone (DMT) system in North America uses 256 "tones" which are each 4.3125 kHz wide in the forward (downstream) direction. The frequency range of the tones is front zero to 1.104 MHz. The lower 32 tones may also be used for duplexed data transmission in the upstream direction. As described in the background section of the application, one acknowledged limitation of the discrete multi-tone transmission system that has generally been thought of as being insolvable is reliable carrier service area signal transmission in the presence of T1 noise.

Figure 2:
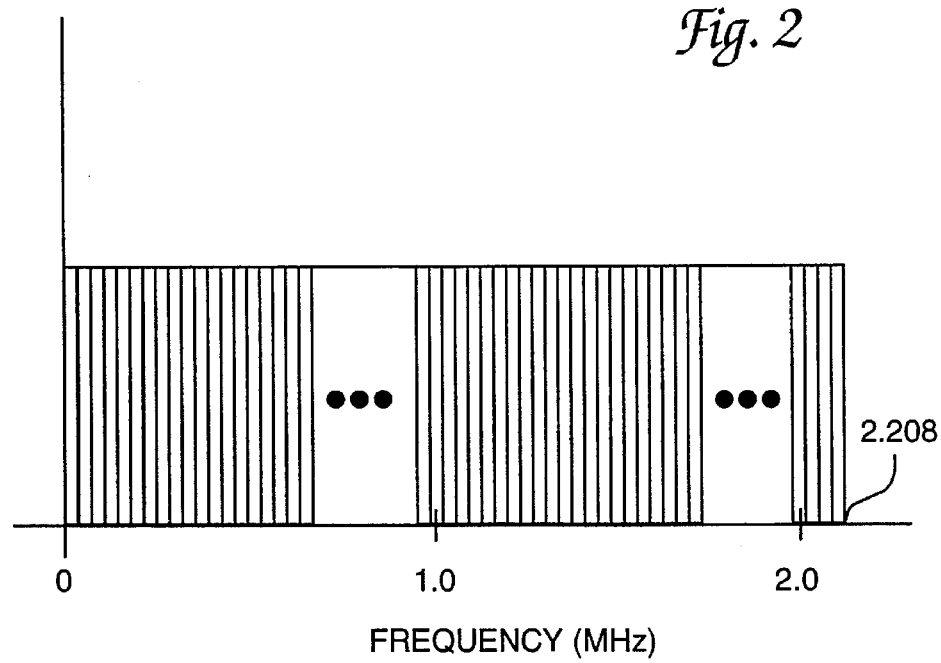
FIG. 2 is a graph illustrating a broadened transmission band in accordance with the present invention.

The solution proposed herein is the doubling of the transmission bandwidth. That is, instead of the 256 subchannel 1.104 MHz bandwidth set forth in the proposed standard (which is seen in FIG. 1), a 512 subchannel 2.208 MHz bandwidth is proposed (as seen in FIG. 2). When desired, the bandwidth available for upstream transmissions may also be increased. By way of example, the upstream communications may be doubled to 64 tones front the 32 tone bandwidth suggested in the proposed ATIS standard.

It has been widely believed that transmissions at frequencies substantially above the 1.1 MHz range (as for example above 1.3 MHz) would not be suitable for transmission over relatively long distances on twisted pair phone lines. However, Applicant's experiments in the area have shown that this is not the case. Rather, transmissions under the discrete multi-tone protocol have been found to work well in the frequency range of one to two megahertz and above as well. Therefore, in an effort to provide backward compatibility with the proposed standard, a 512 subchannel transmission scheme is proposed, with each subchannel having a bandwidth of 4.3125 KHz. It is noted that the described approach is equally applicable to discrete multi-tone transmission schemes having different subchannel bandwidths as well.

Figure 3:
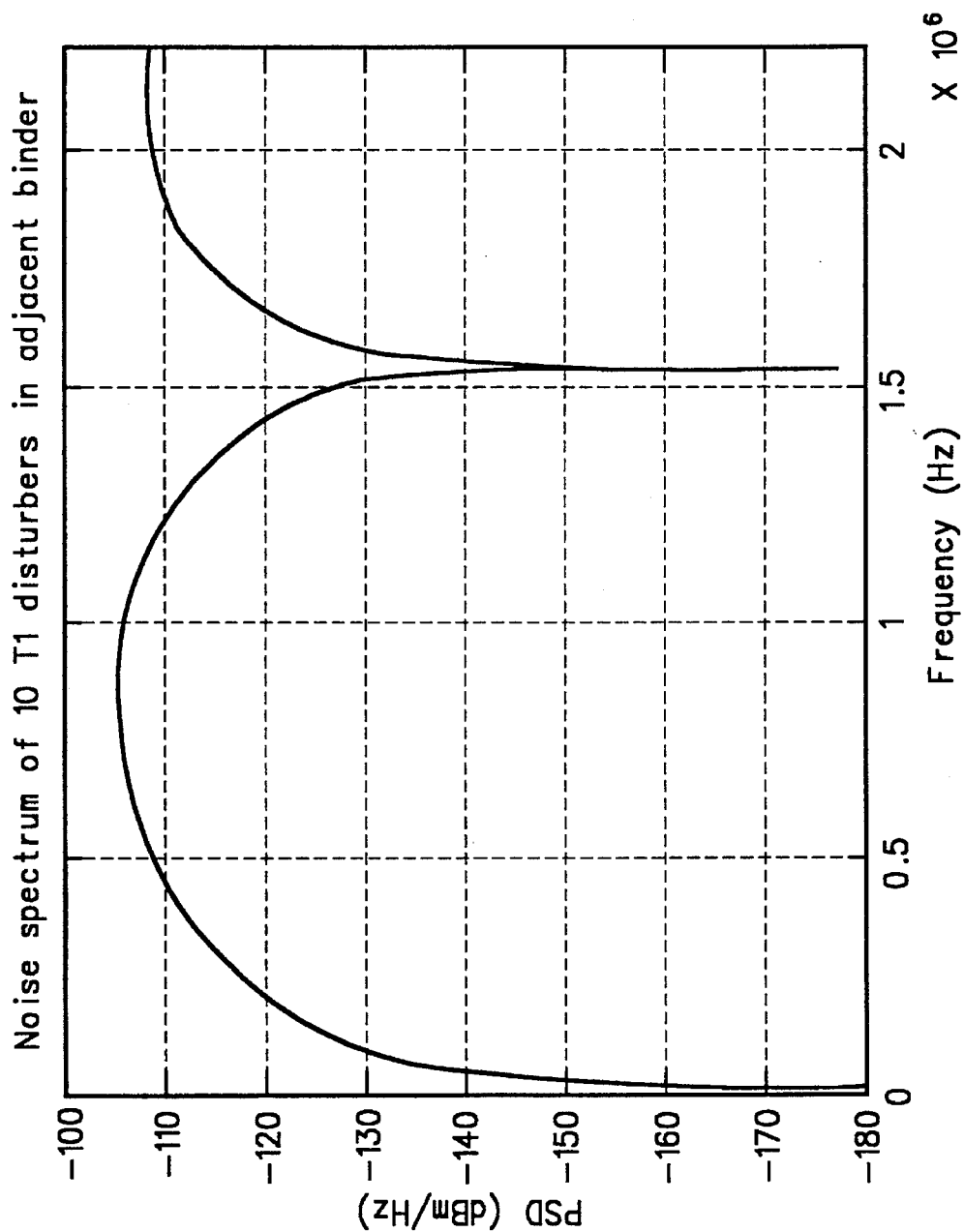
FIG. 3 is a graph illustrating the frequency spectrum of ordinary T1 noise.

Referring next to FIG. 3, the described system's usefulness in carrier service areas that experience T1 noise will be described. As seen therein, T1 noise is not a very big factor at relatively low frequencies (as for example at frequencies below about 600 kHz). However, the magnitude of its interference (cross talk) increases as the frequency increases until it exceeds a level that is acceptable for discrete multi-tone transmission to locations over a mile from a central office. Thus, it is generally agreed that discrete multi-tone transmissions can not be reliably used in subchannels having frequencies above about 600–750 kHz in carrier service areas that experience T1 noise. This is particularly true when the remote locations are located more than about a mile from the source. Thus, T1 noise significantly limits the number of subchannels that are available for data transmission in the forward direction, which severely limits the speed at which digital data can be transmitted as is illustrated by the graph shown in FIG. 4. However, as seen in FIG. 3, at frequencies above approximately 1.3 MHz, the amount of crosstalk generated by T1 noise begins to decline rather significantly. A second hump in the T1 noise curve begins to become significant above about 1.6 MHz. Therefore, subchannels in the range of about 1.3 to 1.6 MHz tend to be relatively immune from T1 cross talk noise. Accordingly, when the broader 512 subchannel bandwidth described above is used, 6 Mbps data transmission rates can be readily achieved even in the presence of significant T1 crosstalk noise in an adjacent (or even the same) binder.

As will be appreciated by those skilled in the art, this overcomes one of the most frequent criticisms of the discrete multi-tone transmission standard for Asymmetric Digital Subscriber Line service in North America. It should be appreciated that the actual transmission bandwidths may vary a great deal from transmission to transmission depending on the noise experienced and the data transmission requirements at any given time. However, it appears that in the presence of T1 noise, most of the data transmissions will occur in the bands between about 50 and 600 kHz and about 1.3 to 1.6 MHz. Since the transmissions are made primarily at frequencies that do not conflict with T1 transmissions, using this higher frequency band has the side benefit of not inducing as much noise on surrounding lines.

Figure 4:
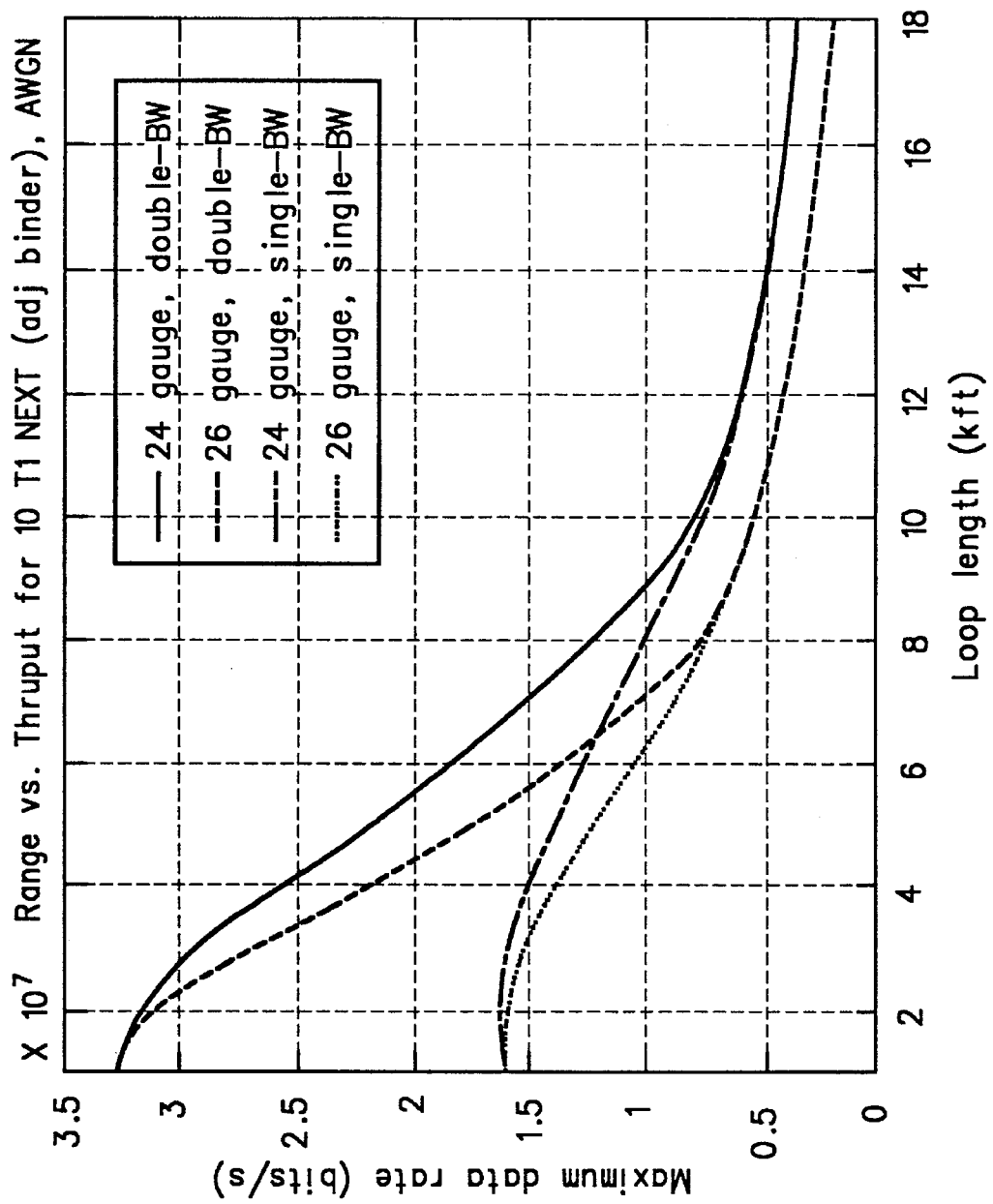
FIG. 4 is a graph contrasting the data rates achievable by the described invention with the data rates achievable by discrete multi-tone transmitters that operate in accordance with the ATIS North American Standard for Asymmetric Digital Subscriber lines in the presence of T1 crosstalk in an adjacent binder for both 26 and 24 gauge twisted pair wires over varying distances.

FIG. 4 is a graph contrasts the data rates achievable by discrete multi-tone transmitters that operate in accordance with the present invention with those that operate in compliance with the ATIS North American Standard for Asymmetric Digital Subscriber lines in the presence of T1 crosstalk in an adjacent binder for both 26 and 24 gauge twisted pair wires over varying distances. As can be seen therein, the described invention has significantly improved data transmission rates in the presence of T1 noise.

Although at the time of this application, Discrete Multi-tone technology has not yet been accepted as a standard outside of North America, it would work well with most modern telephone systems. Therefore, there are potential applications in areas that experience E1 crosstalk noise (as for example in numerous European countries). The preceding description has illustrated the application of the invention in system which experience significant T1 crosstalk noise. However, it should be appreciated that the invention is equally applicable to systems that experience E1 crosstalk noise.

The described arrangement has several other advantages as well. Most notably, in systems that do not experience T1 noise (which is the vast majority of the installed telephone base in North America) significantly higher data transmission rates can be reliably achieved. By way of example, data rates of at least 12 Mbps can be reliably obtained at distances over 6000 feet on twisted pair subscriber lines. Further, when the number of subchannels available for transmission in the reverse direction are also doubled, the potential data transmission rate in the reverse direction can also be significantly improved. By way of example, transmission rate of at least 1.544 Mbps (i.e. the T1 data transmission rate) am readily obtainable.

Figure 5:
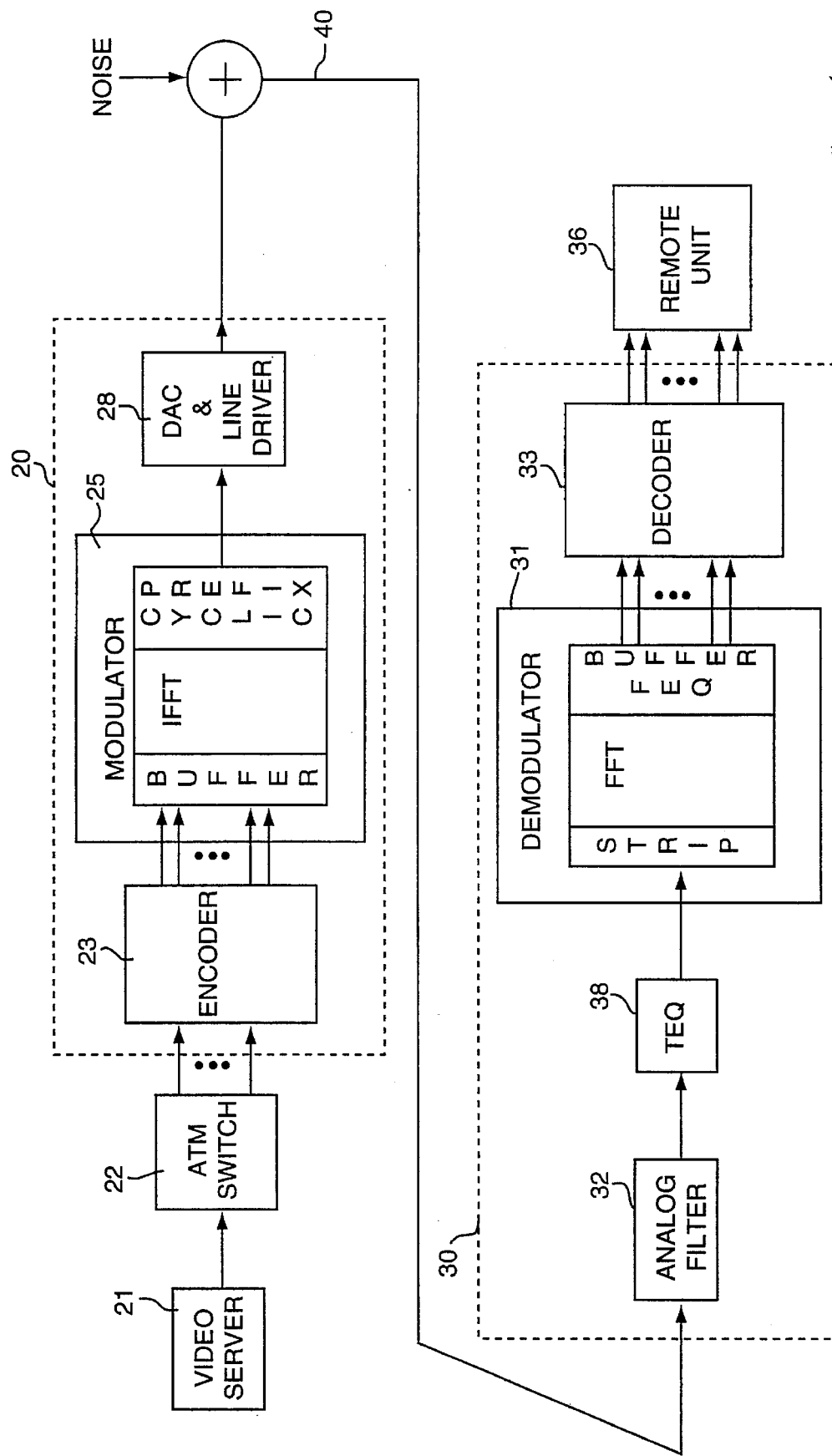
FIG. 5 is a block diagram of a video delivery system that utilizes a discrete multi-tone transmission scheme suitable for implementing the ATIS Asymmetric Digital Subscriber Line standard as well as the present invention.

Referring next to FIG. 5 a video delivery system that operates in accordance with the present invention will be described. A video server 21 provides digital data to transmitter 20 through an asynchronous transfer modem switch 22. The video server 21 can provide data at any data rate up to the maximum data rate permitted in view of the transmission distance, the line quality and type of communication lines used. The transmitter 20 incorporates several components including an encoder 23 and a discrete multi-tone modulator 25. The encoder 23 serves to multiplex, synchronize, encode and compress the video data and is capable of handling data rates of up to 15 million bits per second. More specifically, it translates incoming bit streams into in phase, in quadrature components for each of a multiplicity of subchannels. The encoding may be done using forward error correction and/or trellis coding. Since 512 subchannels are available, the encoder outputs 512 subsymbols sequences that each represent 4 Kbps. These inputs are complex inputs that are passed to a discrete multi-tone modulator 25. By way of example, a suitable encoder is described in detail in the above referenced ATIS standard.

Figure 6:
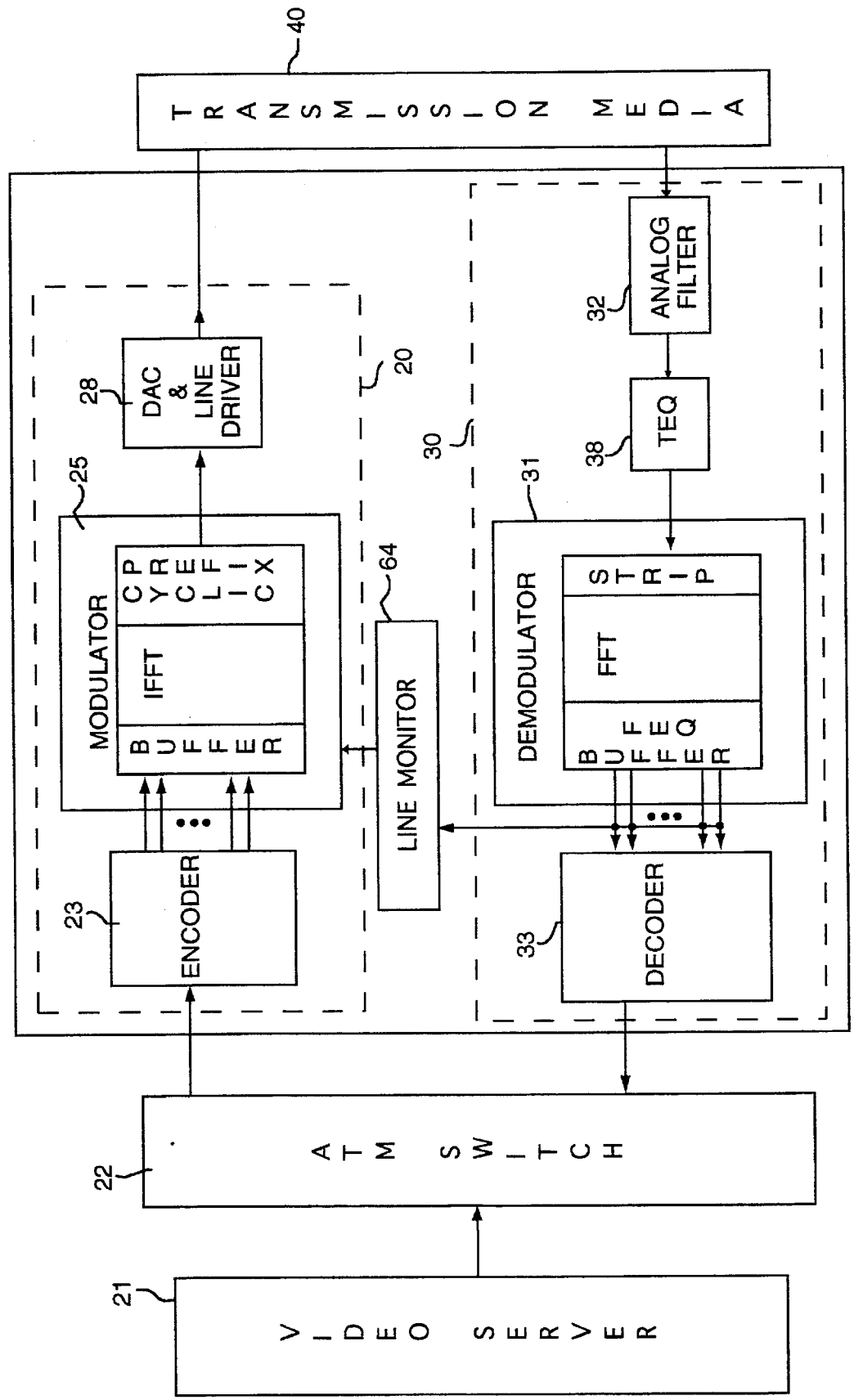
FIG. 6 is a diagrammatic block diagram of a transceiver suitable for implementing the present invention.

The modulator 25 is an IFFT modulator that computes the inverse Fourier transform by any suitable algorithm. Since the encoder outputs are complex numbers, the IFFT modulator receives 1024 inputs. The bit distribution is determined adaptively in discrete multi-tone systems as described in both the referenced ATIS standard and Peter S. Chow et al.'s application Ser. No. 08/057,301, U.S. Pat. No. 5,479,447. To facilitate this, the transmitter 20 also includes a line monitor 64 (see FIG. 6) that monitors the communication line to determine the line quality of each of the available subchannels. In one embodiment, the line monitor determines the noise level, signal gain and phase shift on each of the subchannels. The object is to estimate the signal to noise ratio for each of the subchannels. Therefore, other parameters could be monitored as well or in place of the parameters described. The determination of what subchannels to transmit the encoded data over as well as how much data to transmit over each subchannel is dynamically determined on the basis of several factors. The factors include the detected line quality parameters, subchannel gain parameters, a permissible power mask, and the desired maximum subcarrier bit-error rates. It is noted that the various factors need not be constant between subchannels and indeed may even vary during use. Most notably the line quality parameters are continually checked and adjustments in the modulation scheme are made in real time to dynamically adjust the modulation as the line quality over various subchannels changes during use. By way of example, a suitable discrete multi-tone modulator is described in the same ATIS standard.

After the encoded signal has been modulated to form a discrete multi-tone signal, a cyclic prefix is appended to the discrete multi-tone encoded signal. The cyclic prefix is used primarily to simplify the demodulation of the discrete multi-tone signals. In the ATIS standard, a 32 bit cyclic prefix is used. However, with the larger bandwidth of the described embodiment, it would be preferable to double the length of the cyclic prefix as well. The transmitter also includes a line driver 28 which applies the discrete multi-tone signal to the communication line 40, which may take the form of a twisted pair phone line. Of course, other conventional communications lines can be used as well. Twisted pair lines are of particular interest due to their wide spread use in installed communication systems.

The discrete multi-tone encoded signal with its cyclic prefix is then transmitted over the communication line 29 to a remote location. In the described 512 subchannel embodiment, the discrete multi-tone signal has a total available bandwidth of approximately 2.208 MHz. In one embodiment, the transmitter is located at a central office in a telephone carrier service area and the communication line is a twisted pair channel. In other embodiments different communication lines may be used.

The signal is then received by a receiver 30 located at a remote location. The receiver has an analog filter 32, a time domain equalizer 38 (TEQ), a demodulator 31 that demodulates the equalized discrete multi-tone signal and strips the cyclic prefix, and a decoder 33 that decodes the demodulated signal. The demodulator 31 and the decoder 33 perform inverse functions of the modulator 25 and encoder 23 respectively. The decoded signal is then passed from the decoder 33 to a remote unit 36 such as a television, a computer, or other suitable receiving apparatus. The function of the time domain equalizer, the demodulator 31 and the decoder 33, as well as algorithms suitable for accomplishing the desired functions are all described in more detail in Chow et al.'s U.S. Pat. No. 5,285,474 which is incorporated herein by reference.

The upstream encoding and modulation may be done in exactly the same manner as the described downstream data transmission. However, in the described embodiment, just 64 subchannels are made available to upstream communications. However, it should be appreciated that any number of subchannels could be made available for such upstream communications.

Although only a few embodiments of the present invention have been described herein, it should be understood that the present invention may be embodied in many other specific forms without departing from the spirit or scope of the invention. Particularly, the invention has been described in terms of an embodiment that is backwards compatible with the proposed ATIS North American Asymmetric Digital Subscriber Line Standard. However, it should be appreciated that the invention is equally applicable to discrete multitone data transmission schemes that are symmetric as well as asymmetric. Further, the invention is in no way limited to transmission schemes having the specific subchannel widths described. Rather, it may readily be applied to a broad range of transmission schemes. The point is that data can be reliably transmitted over telephone lines in subchannels located at higher frequencies then was previously believed to be possible. In view of the foregoing, the present examples are to be considered as illustrative and not restrictive, and the invention is not to be limited to the details given herein, but may be modified within the scope of the appended claims.

I claim:

1. A discrete multi-tone transmitter that is suitable for transmitting digital data over a twisted pair communication line on a multiplicity of subcarriers having different frequencies, the transmitter comprising:

an encoder for encoding digital information, the encoder being capable of encoding digital information at speeds in excess of six megabits per second;

a modulator for modulating the encoded digital information onto a multiplicity of subcarriers in a discrete multi-tone signal, each subcarrier corresponding to an associated tone and an associated subchannel, wherein the available subcarriers for the discrete multi-tone encoded signal have a combined bandwidth of at least 1.6 MHz, the modulation being arranged to take into consideration at least detected line quality parameters and a permissible power mask parameter, and wherein the modulation is capable of dynamically updating both the subchannels used and the amount of data transmitted on each subchannel during transmission in order to accommodate real time changes in specific parameters; and an adder for appending a cyclic prefix to the discrete multi-tone signal before it is applied to the transmission line.

2. A transmitter as recited in claim 1 wherein the modulator modulates the encoded digital information onto subcarriers that correspond to subchannels that each have a bandwidth that is approximately 4.3125 kHz wide.

3. A transmitter as recited in either claim 1 or 2 wherein the modulator is capable of transmitting information on 512 separate subchannels.

4. A transmitter as recited in claims 3 wherein the multi-tone modulation is done in substantial compliance with the ATIS North American Asymmetric Digital Subscriber Lines standard and wherein the subchannels that occur at frequencies above those set forth in the standard are treated similarly to those within the standard range in terms of subcarrier selection criteria.

5. A transmitter as recited in claim 3 wherein the transmitter may also be used in a standard mode that utilizes a maximum of the lower 256 subchannels and is compatible with the ATIS North American Asymmetric Digital Subscriber Lines standard.

6. A transmitter as recited in claim 1 wherein when T1 noise is detected, the modulator is arranged to transmit the encoded digital information at frequencies above and below the most significant T1 noise to facilitate transmission of the encoded digital data throughout a carrier service area at data rates of at least six million bits per second (6 Mbps).

7. A transmitter as recited in claim 1 that is capable of transmitting the encoded digital information to a remote location that is up to six thousand feet from the transmitter, at a rate of at least ten million bits per second (10 Mbps) over a communication line that takes the form of a twisted pair phone line.

8. A discrete multi-tone receiver for receiving a first set of multi-tone encoded digital information over a communication line that may take the form of a twisted pair communication line, the receiver comprising:

a demodulator for demodulating the encoded digital information from a multiplicity of subcarriers in a discrete multi-tone signal at data rates in excess of six megabits per second, each subcarrier corresponding to an associated tone and an associated subchannel, wherein the available subcarriers for the discrete multi-tone encoded signal have a combined bandwidth of at least 1.6 MHz, the demodulation being arranged to receive modulation information as part of the discrete multi-tone signal, wherein the demodulator is capable of dynamically updating during reception in response to changed modulation information in order to accommodate real time changes in the modulation scheme, the demodulator being arranged to strip the cyclic prefix from the discrete multi-tone signal;

a decoder for decoding the demodulated digital information in real time;

an encoder for encoding a second set of digital information; and a modulator for modulating the encoded second set of digital information onto a multiplicity of subcarriers in a second discrete multi-tone signal, each subcarrier in the second discrete multi-tone signal corresponding to an associated tone and an associated subchannel, wherein the available subcarriers for the second discrete multi-tone encoded signal have a combined bandwidth that is significantly less than the bandwidth of the subcarriers that are available to the first discrete multi-tone encoded signal.

9. A receiver as recited in claim 8 wherein the second discrete multi-tone encoded signal has up to sixty four separate subcarriers and is transmitted over the communication line to a source.

10. A receiver as recited in claim 8 wherein the demodulator further includes a time domain equalizer.

11. A method of transmitting digital information from a source over a potentially noisy communication line that may take the form of a twisted pair communication line using a discrete multi-tone transmission scheme having a multiplicity of tones wherein the digital information is encoded and modulated onto a multiplicity of subcarriers, each subcarrier corresponding to an associated tone, the method comprising the steps of:

monitoring the communication line to determine at least one line quality parameter indicative of noise levels at each of a multiplicity of subchannels that correspond to associated ones of said tones;

encoding a digital data stream;

forming a discrete multi-tone encoded signal from the encoded digital data stream using a discrete multi-tone modulator, wherein the available subcarriers for the discrete multi-tone encoded signal have a combined bandwidth of at least 1.6 MHz, the encoding and modulation being arranged to take into consideration the detected line quality parameters, and a permissible power mask parameter, and wherein the modulation system is capable of dynamically updating both the subchannels used and the data transmission rate over each subchannel used during transmission in order to accommodate real time changes in specific parameters;

appending a cyclic prefix to the discrete multi-tone encoded signal;

transmitting the discrete multi-tone encoded signal and its cyclic prefix over the communication line to a remote location.

12. A method as recited in claim 11 further comprising the steps of receiving the signal at the remote location and demodulating and decoding the signal received at the remote location.

13. A method as recited in claim 1 wherein the tones each have a bandwidth that is approximately 4.3125 kHz wide.

14. A method as recited in claim 13 wherein up to 512 tones may be utilized to facilitate the use of a bandwidth of approximately 2.208 MHz.

15. A method as recited in one of claims 11 and 14 wherein the multi-tone encoding is done in substantial compliance with the ATIS Asymmetric Digital Subscriber Lines standard and wherein the subchannels that occur at frequencies above those set forth in the standard are treated similarly to those within the standard range in terms of subcarrier selection criteria.

16. A method as recited in claim 11 wherein when T1 noise is detected during said monitoring step, the modulator is arranged to transmit the data at frequencies above and below the most significant T1 noise to facilitate transmission of the encoded digital data throughout a carrier service area.

17. A method as recited in claim 16 wherein the data transmission rate over twisted pair communication lines may be at least six million bits per second (6 Mbps) at distances of up to two miles even in the presence of T1 noise.

18. A method as recited in claim 11 wherein the communication line is a twisted pair phone line, the remote location may be up to six thousand feet from the transmitter, and the digital data may be transmitted at a rate of at least ten million bits per second (10 Mbps).

19. A method as recited in claim 13 further comprising the steps of encoding and modulating a second set of data at the remote location and transmitting the second set of data over the communication line back to the source on a second discrete multi-tone signal having up to sixty four separate tones.

20. A method as recited in claim 18 wherein the digital data in the second set of data is transmitted at a data transmission rate of at least 1.544 million bits per second.

* * * * *